(12) United States Patent
Pavlicek

(10) Patent No.: US 11,576,347 B1
(45) Date of Patent: Feb. 14, 2023

(54) ANIMAL EYE-WEAR RETAINER

(71) Applicant: Klay Joseph Pavlicek, Austin, TX (US)

(72) Inventor: Klay Joseph Pavlicek, Austin, TX (US)

( * ) Notice: Subject to any disclaimer, the term of this patent is extended or adjusted under 35 U.S.C. 154(b) by 351 days.

(21) Appl. No.: 16/676,355

(22) Filed: Nov. 6, 2019

Related U.S. Application Data

(60) Provisional application No. 62/757,136, filed on Nov. 7, 2018.

(51) Int. Cl.
 *A01K 13/00* (2006.01)

(52) U.S. Cl.
 CPC .................. *A01K 13/006* (2013.01)

(58) Field of Classification Search
 CPC ....... A01K 13/006; G02C 3/003; G02C 3/006
 See application file for complete search history.

(56) References Cited

U.S. PATENT DOCUMENTS

| | | | | |
|---|---|---|---|---|
| 1,819,738 A | * | 8/1931 | Daniels | G02C 5/02 351/156 |
| 3,789,942 A | | 2/1974 | Kowalik | |
| 4,178,742 A | | 12/1979 | Longfellow | |
| 4,756,145 A | | 7/1988 | Pelling | |
| 4,998,816 A | * | 3/1991 | Eggenberger | G02C 3/003 351/123 |
| 5,406,340 A | | 4/1995 | Hoff | |
| 5,732,415 A | * | 3/1998 | Boyd | A61D 9/00 2/426 |
| 5,781,273 A | * | 7/1998 | Boden | G02C 3/003 351/142 |
| 5,868,104 A | | 2/1999 | Ramirez | |
| 6,311,645 B1 | | 11/2001 | Brown | |
| 6,449,777 B1 | | 9/2002 | Montague | |
| 7,581,513 B2 | | 9/2009 | Di Lullo et al. | |
| 9,516,862 B1 | | 12/2016 | Emilo | |
| 9,753,304 B2 | | 9/2017 | Hadden et al. | |
| D806,781 S | | 1/2018 | Johnston | |
| 2003/0101542 A1 | * | 6/2003 | Mackay | G02C 11/00 24/3.4 |
| 2005/0036103 A1 | * | 2/2005 | Bloch | G02C 5/146 351/116 |
| 2005/0151924 A1 | * | 7/2005 | Di Lullo | A01K 13/006 351/62 |
| 2009/0323018 A1 | * | 12/2009 | Pettingill | G02C 3/003 351/157 |

(Continued)

*Primary Examiner* — Joshua T Kennedy
(74) *Attorney, Agent, or Firm* — The Law Firm of H. Dale Langley, Jr., PC

(57) ABSTRACT

An animal eye wear retainer that secures a variety of human anatomy eye-wear on a multitude of animal's heads, to provide animals eye-wear retention and use of human anatomy eye-wear for function or fashion. The retainer assembly (200) includes a right temple arm fastener (210), tether (220), left temple arm fastener (230), strap segment (240), strap segment (250), and a plurality of fasteners, tri-glides, & slides. The temple arm fasteners (210 & 230) allow for interchanging human anatomy eye wear. The adjustable tether and straps accommodate for variety of animal crania anatomy while providing constant tension or force which holds the retained human anatomy eye-wear securely to the animal's face during intense activities.

7 Claims, 6 Drawing Sheets

(56) References Cited

U.S. PATENT DOCUMENTS

| | | | | |
|---|---|---|---|---|
| 2010/0283961 A1* | 11/2010 | Williams | ............... | G02C 3/006 |
| | | | | 351/157 |
| 2013/0162941 A1* | 6/2013 | Johnson | ................... | D04C 1/06 |
| | | | | 351/157 |
| 2017/0064923 A1* | 3/2017 | Choi | .................... | A01K 13/006 |

* cited by examiner

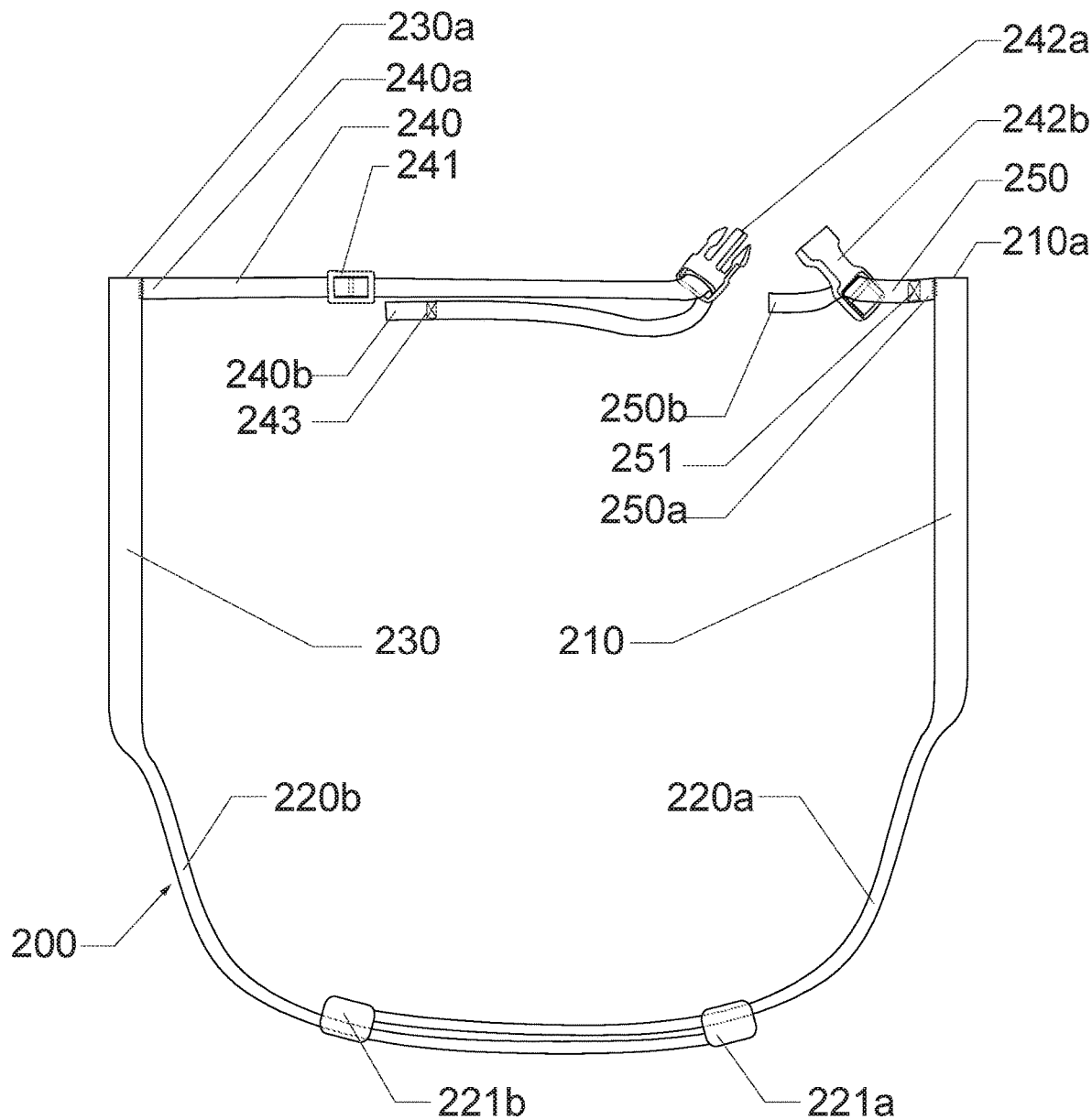

ANIMAL EYE-WEAR RETAINER

CROSS-REFERENCE TO RELATED APPLICATIONS

This application claims the benefit of provisional patent application Ser. No. 62/757,136, filed 2018 Nov. 7 by the present inventor.

FEDERAL SPONSORSHIP

Not Applicable

I. TECHNICAL FIELD

This invention pertains generally to animal eye-wear that may be functional protection or a fashionable attire. More particularly, the invention pertains to eye-wear suitable for use on animals that remain secured to the animal's head during movement or intense activity.

II. BACKGROUND—PRIOR ART

The following is a tabulation of some prior art that presently appears relevant:

| U.S. patents | | | |
|---|---|---|---|
| Pat. No. | Kind Code | Issue Date | Patentee |
| 4,178,742 | A | 1979 Dec. 18 | Longfellow |
| 4,756,145 | A | 1988 Jul. 12 | Pelling |
| 5,732,415 | A | 1998 Mar. 31 | Boyd |
| 5,406,340 | A | 1995 Apr. 11 | Hoff |
| 5,868,104 | A | 1999 Feb. 9 | Ramirez |
| 6,311,645 | B1 | 2001 November | Brown |
| 6,449,777 | B1 | 2002 Sep. 17 | Montague |
| 7,581,513 | B2 | 2009 Sep. 1 | Di Lullo et al. |
| D806,781 | S | 2018 Jan. 2 | Johnston |
| 8,789,942 | B2 | 2014 Jul. 29 | Johnson |
| 9,516,862 | B1 | 2016 Dec. 13 | Emilo |
| 9,753,304 | B2 | 2017 Sep. 5 | Hadden et al. |

| U.S. Patent Application Publications | | | |
|---|---|---|---|
| Patent Number | Kind Code | Publication Date | Applicant |

| Foreign Patent Documents | | | |
|---|---|---|---|
| Foreign Doc. Nr. | Cntry Code | Kind Code Pub. Dt. | App or Patentee |

Nonpatent Literature Documents

Eye-wear is commonly used by people for a combination of reasons. The most common reasons for eye protection include correcting vision, protecting eyes from harmful ultra violet (UV) light, glare, or wind and debris. People also wear eye-wear for fashionable attire, sometimes in combination with vision correction or protection.

Animals have very similar needs for eye-wear. Excessive UV exposure can affect common animal eye diseases like chronic superficial keratitis or "pannus". Dog owners commonly transport their pets in a motor vehicle with open windows that expose the animal to high velocity wind where debris such as leaves, insects, or rocks could strike them and cause damage to the cornea. Animals also suffer from degraded vision with age just as humans do, often known as Nuclear Sclerosis.

Since eye-wear is an essential functional and fashionable accessory for animals, it is imperative for eye-wear to be retained during intense activity, movement, or windy environments. However, there are significant anatomical differences in animal skulls as compared to the human skull. Problems arise when fitting eye-wear to animals where the physiology of the crania is very different from that of humans. For example, human eye-wear does not fit the canine head because the ears are higher on the skull. The temple arms of human eye-wear would not rest properly on the ears to keep eye-wear functionable.

I have found that U.S. Pat. No. 5,868,104 Ramirez, is limited to small animal crania physiology, as the strap is not adjustable to fit different sized animal crania anatomy. I have also found that the limited adjustments would not secure eye-wear or prevent eye-wear from becoming dislodged during intense activity. I have also found that the system fails to accommodate alternate types of eye-wear needs, without replacing the entire system, as the coupling is permanently fixed to the eye-wear temple arms, or limited to eye-wear with receptive compartments. I have found that U.S. Pat. No. 5,732,415 Boyd, is limited in use, particularly for Canine crania physiology.

In most mammalian vertebrate animals, the mandible and the muzzle extend beyond the anterior surface of the cranium. Even different animal breeds are characterized by differences in the physiology of the crania. Canines for example, a Chihuahua compared to a German Shepherd.

Therefore, like humans, animals have very common function and fashionable eye-wear needs and it is far more difficult to adapt a securing means that will maintain eye-wear in position on many types of animal crania. Thus, there is a need for eye-wear retention to accommodate multiple types of functionable and fashionable eye-wear on animals that won't be incidentally removed.

III. SUMMARY

Embodiments according to aspects of the invention are capable of securing a variety of human anatomy eye-wear on a multitude of animal's heads, to provide animals eye-wear retention and use of human anatomy eye-wear for function or fashion.

The animal eye-wear temple arm fasteners allow interchangeability of common human anatomy eye-wear. The temple arm fasteners retain human anatomy eye-wear through a constant tension, friction, or force which holds the temple arms of human anatomy eye-wear. Interchangeability of human anatomy eye-wear allows animals to utilize a variety of human anatomy eye-wear for all common uses, whether to block UV, shield wind or debris, aid vision, fashionably, or any other purpose where eye-wear would be required. The animal eye-wear retainer embodiments according to the invention provides eye-wear retention of human anatomy eye-wear ergonomically to a multitude of animal crania anatomy. Adaptation to animal crania anatomy variety is conveyed through tether and plurality of strap segment adjustments. The adjustable tether and straps provide constant tension or force which holds the retained eye-wear securely to the animal's face during intense activities. Fasteners assist in positioning tether and strap segments which encircle the animals head and muzzle.

An even further object of the present invention is to provide an animal eye-wear retainer which is susceptible of low cost and manufacture with regard to both materials and labor, and which accordingly is then susceptible of low prices of sale to the consuming public, thereby making the animal eye-wear retainer economically available to the buying public to use their choosing of human anatomy eye-wear on animals.

The accompanying drawings, which are incorporated in and constitute a portion of this specification, illustrate embodiments of the invention and, together with detailed description, serve to further explain the invention; however, it should be understood that the invention is not limited to the precise arrangements and instrumentalities shown. For a fuller understanding of the nature and advantages of the invention, reference should be made to the detailed description in conjunction with the accompanying drawings.

IV. DESCRIPTION OF DRAWINGS

Non-limiting and non-exhaustive embodiments of the disclosure are described herein, including various embodiments of the disclosure illustrated in the figures listed below.

FIG. 6A is a top plan view of animal eye-wear retainer assembly according to one embodiment.

V. DRAWINGS—REFERENCE NUMERALS

Figure 1:
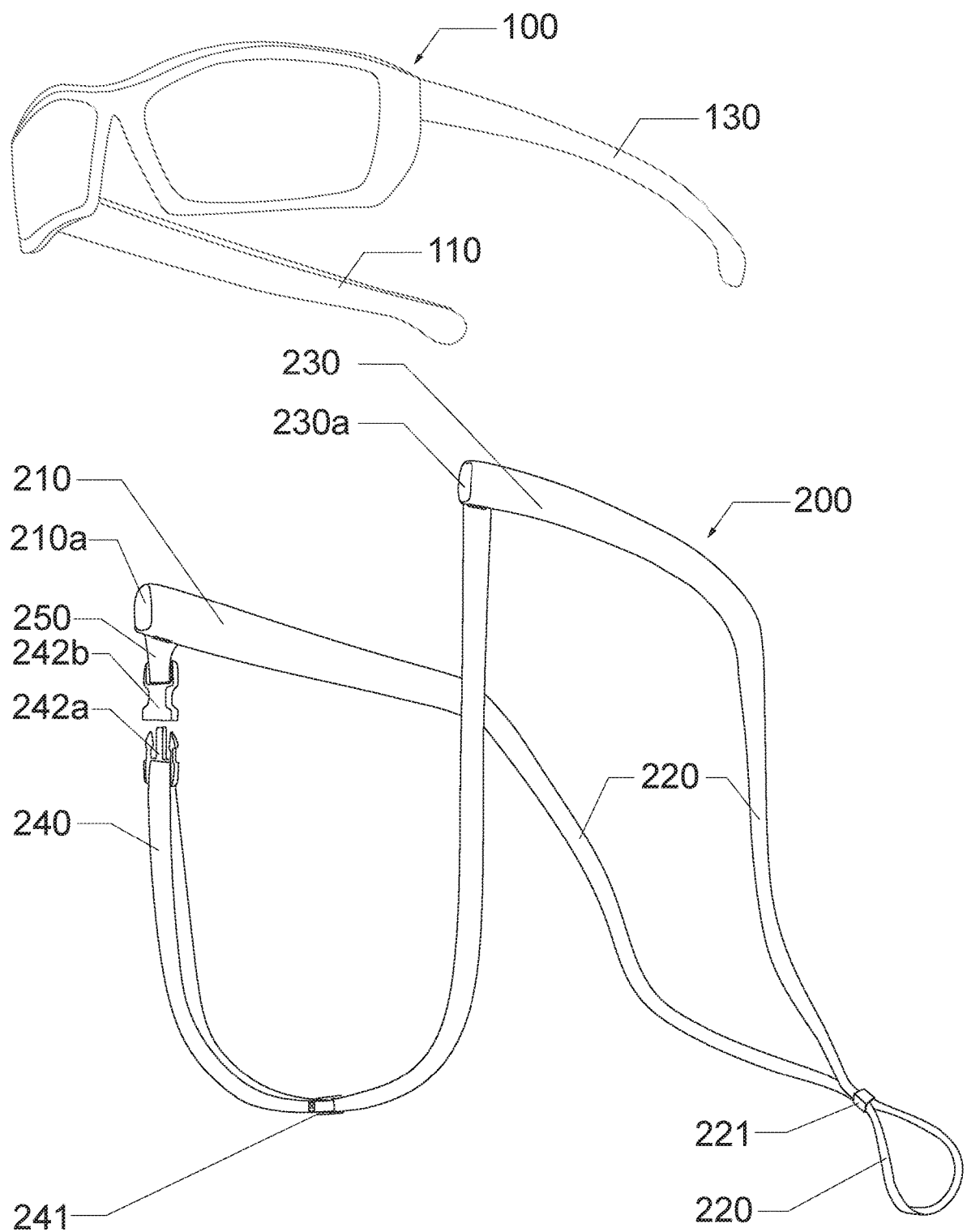
FIG. 1 is a front perspective view of the animal eye-wear retainer of the present invention having the human anatomy eye-wear separate.

100—Human anatomy eye-wear
110—Human anatomy eye-wear right temple arm
130—Human anatomy eye-wear left temple arm
200—Eye-wear retainer assembly
210—right temple arm fastener
210a—temple arm fastener terminal opening
220—tether
220a—tether
220b—tether
221—adjustable slide buckle
221a—tether slide coupling
221b—tether slide coupling
230—left temple arm fastener
230a—temple arm fastener terminal opening
240—strap segment
240a—first end of strap segment 240
240b—second end of strap segment 240
241—sliding tri-glide
243—stitching
242a—first half of fastener
242b—second half of fastener
250—strap segment
250a—first end of strap segment 250
250b—second end of strap segment 250
251—stitching

VI. DETAILED DESCRIPTION

The following description provides details of various embodiments of the invention, one or more examples of which are set forth below. Each of theses embodiments are provided by way of explanation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The apparatus of the present invention is particularly well suited for securing a variety of human anatomy eye-wear on a multitude of animal's heads for function or fashionable use by animals. The animal eye-wear retainer generally includes a retainer assembly 200 which fastens to a human anatomy eye-wear 100 and secures it to the animal's face. The retainer assembly 200 has two points where human anatomy eye-wear 100 right and left temple arms 110 & 130 are inserted into right and left temple arm fasteners 210 & 230, which thereby applies a holding force of the eye-wear. The retainer assembly 200 retains the human anatomy eye-wear via a plurality of temple arm fasteners 210 & 230, a tether 220, and a plurality of strap segments 240 & 250, which cumulatively apply a constant force against both the maxilla and face of the animal, securing the human anatomy eye-wear to the animal's head, preventing incidental removal during intense activities.

With reference to FIG. 1 the animal eye-wear retainer assembly 200 is shown separate from human anatomy eye-wear 100. Retainer assembly 200 is constructed of a right temple arm fastener 210, tether 220, left temple arm fastener 230, strap segment 240, and strap segment 250.

As appreciable, some components described herein as separate components may be manufactured as a single component and/or permanently joined as a single component after manufacturing. Various components described herein, including tethers, temple fasteners, straps, fasteners, tri-glides, slides, stitching and/or any subcomponents thereof may be manufactured using any of a wide variety of materials and/or using a wide variety of manufacturing techniques including: plastic, rubber, leather, metal, neoprene, cloth, cotton, fabric, glass, fibers, carbon fiber, glass fibers, and/or any other suitable component for any given component or subcomponent.

Figure 2:
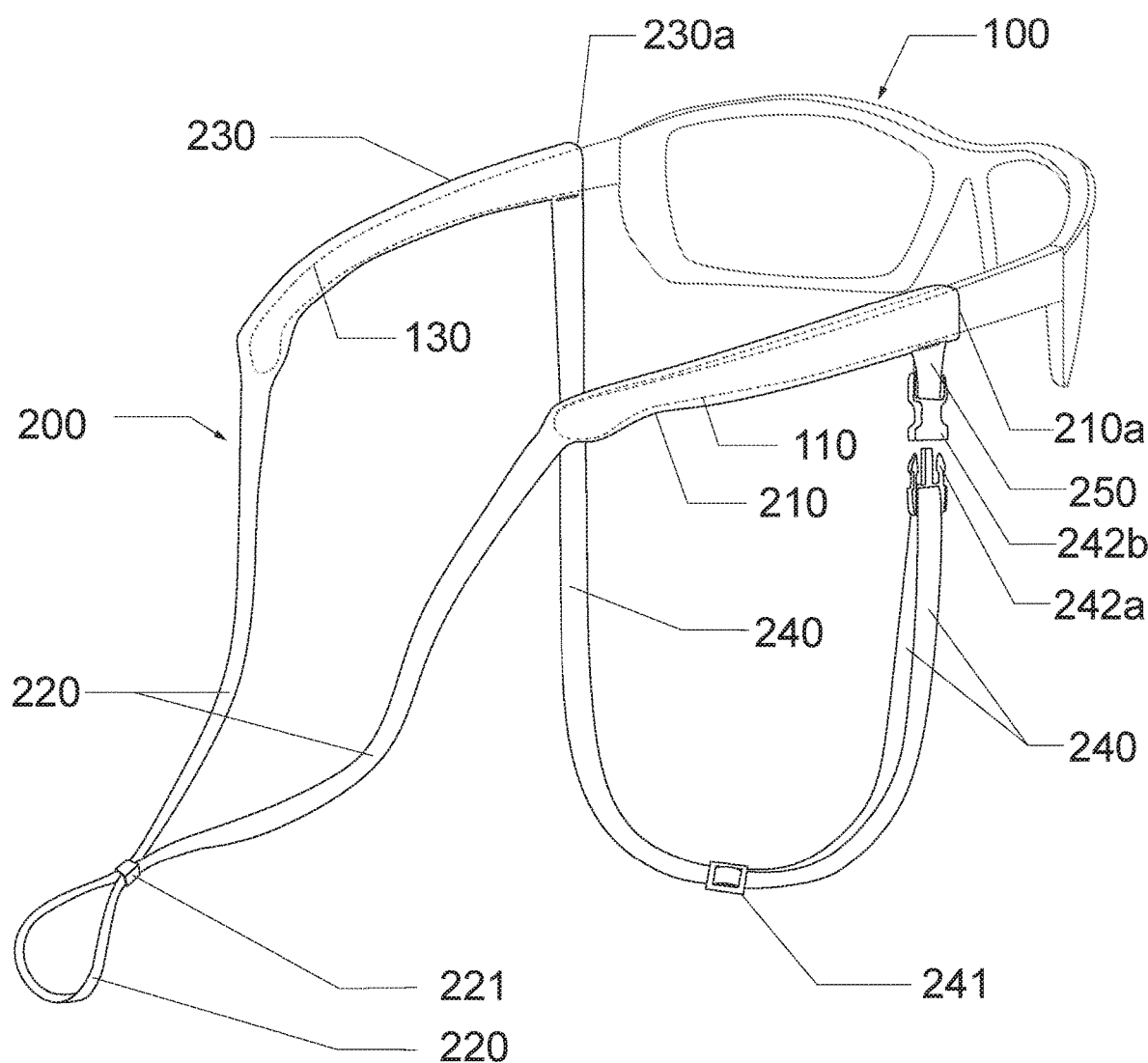
FIG. 2 is a rear perspective view of the animal eye-wear retainer of the present invention having the human anatomy eye-wear inserted into the temple arm fasteners.

With reference to FIG. 2 the animal eye-wear retainer assembly 200 shows temple arms 110 & 130 of human anatomy eye-wear 100 inserted into the temple arm fastener terminal openings 210a and 230a of temple arm fasteners 210 and 230.

Temple arm fastener terminal openings 210a and 230a are constructed to maintain an opening that will accept the eye-wear temple arms 110 and 130 of human anatomy eye-wear 100. When temple arms 110 and 130 are inserted into temple arm fastener terminal openings 210a and 230a and temple arm fasteners 210 and 230, they expand to fit the inserted temple arms 110 and 130. Temple arm fastener terminal openings 210a and 230a and temple arm fastener 210 and 230 are constructed to contract and apply a constant tension, friction, or force to the eye-wear temple arms 110 & 130, holding them firmly in place. The temple arm fastener 210 and 230 may be coupled to the temple arms of the eye-wear via a semi-flexible bore, fabric sleeve, or any other passive fastener configured to couple to the temples of the eye-wear until removal by the user.

The expansion and contraction of the temple arm fasteners 210 and 230 in conjunction with the temple arm fastener terminal openings 210a and 230a allow a variety of human anatomy eye-wear temple arm 110 and 130 forms to be inserted and retained.

Tether 220 is coupled to temple arm fastener 210 and 230 as to encircle the head. In various embodiments the tether may be rigid, semi-rigid, flexible, deformable, resilient, compressible, liquid impermeable, configured to float, configured to return to an original shape, fireproof, waterproof, heat resistant, flame resistant, magnetic, and/or have other properties suited to a particular application.

Figure 3:
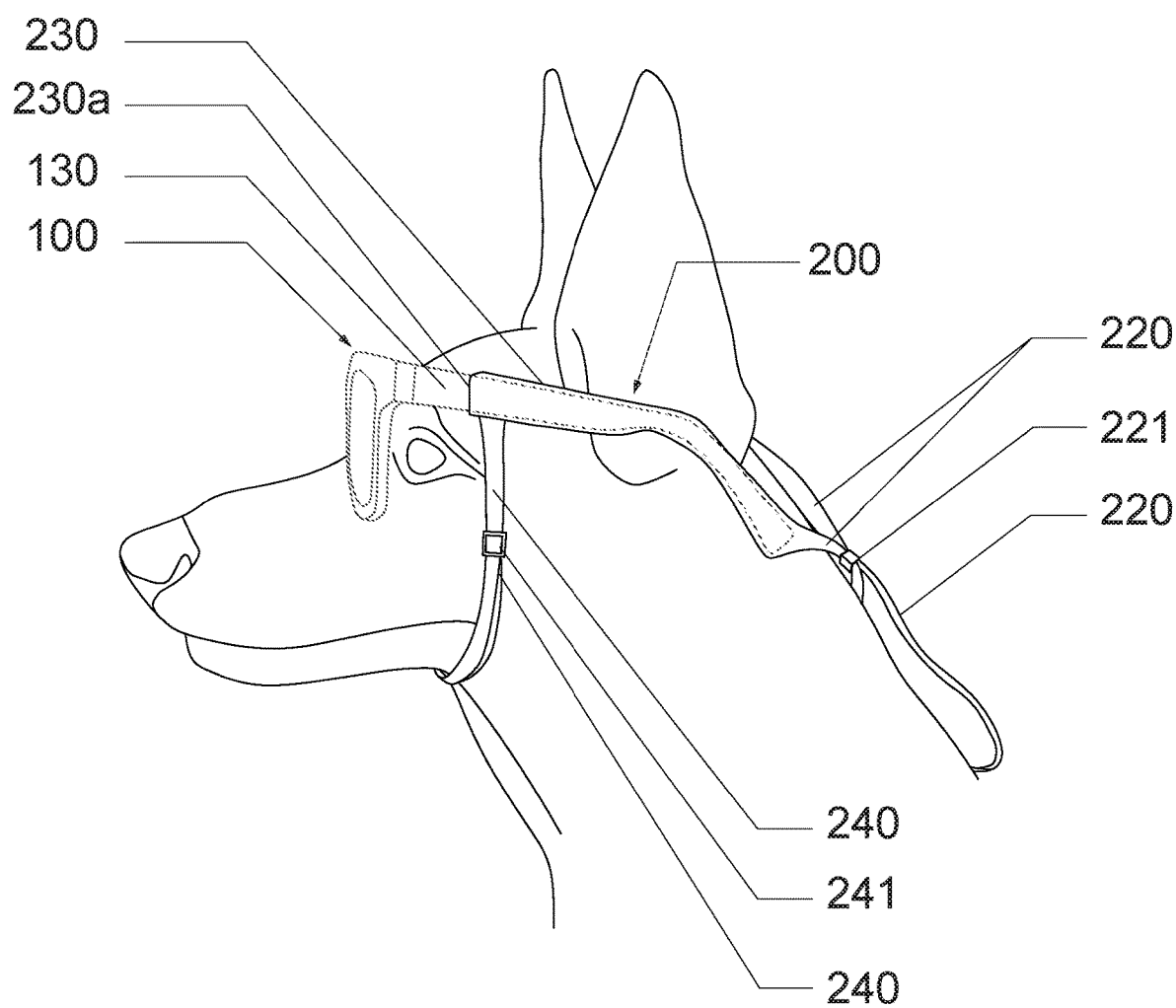
FIG. 3 is a left-hand side view of canine wearing position of animal eye-wear retainer of the present invention with human anatomy eye-wear inserted into the temple arm fasteners.
Figure 4:
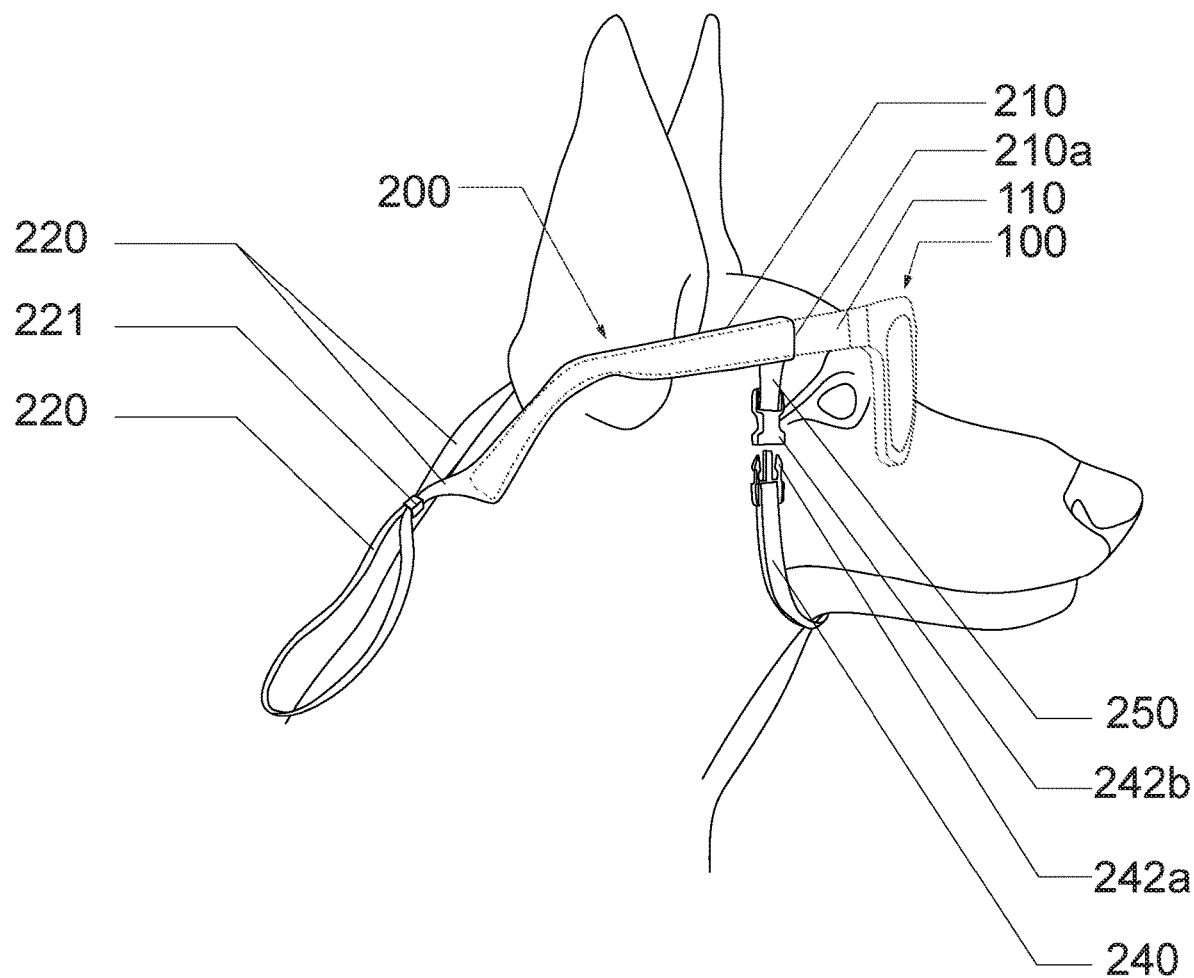
FIG. 4 is a right-hand side view of canine wearing position of animal eye-wear retainer of the present invention with human anatomy eye-wear inserted into the temple arm fasteners.

As shown in FIGS. 3 & 4, side views of canine wearing position, adjustable slide buckle 221 in conjunction with tether 220 encircle the head and apply a firm holding force of human anatomy eye-wear 100 toward the face of the animal as human anatomy eye-wear 100 rests on the maxilla.

In certain embodiments, tether 220 may be described as a single tether coupled to two temple arm fasteners 210 and 230 at the first and second end of the tether with an adjustable slide buckle 221. This embodiment's adjustable slide buckle 221 may allow length of the tether 220 to be adjusted. More specifically, a user may draw the adjustable slide buckle 221 toward the temple arm fastener ends 210 and 230 to cause a larger portion of tether 220 to extend past the adjustable slide buckle 221. Collectively, length of the tether 220 decreases (e.g. length between temple arm fasteners 210 & 230) which accommodates a smaller sized animal neck or head and/or to fit closer to the back of the head (e.g. apply more retainment force).

Similarly, a user may draw the adjustable slide buckle 221 away from the ends of temple arm fasteners 210 and 230 to cause a smaller portion of tether 220 to extend past the adjustable slide buckle 221. Collectively, length of the tether 220 increases (e.g. length between temple arm fasteners 210 & 230) which accommodates a larger sized animal neck or head and/or to loosen the tether.

Figure 5:
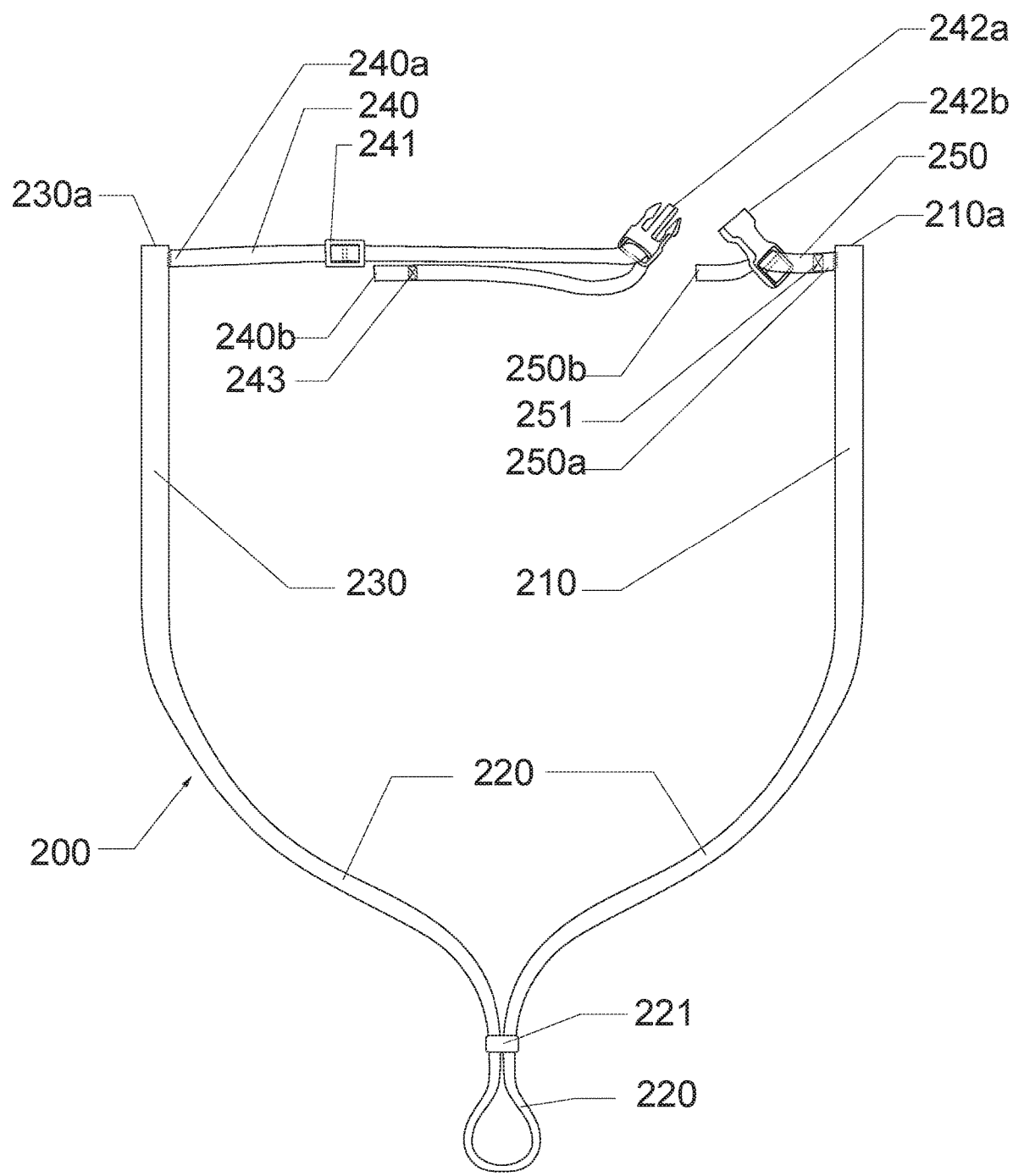
FIG. 5 is a top plan view of animal eye-wear retainer assembly type shown in FIG. 1.

With reference to FIG. 5 top plan view of retainer assembly, strap segment 240 is coupled to temple arm fastener 230 by stitching the first strap end 240a near temple arm fastener terminal opening 230a. Strap segment 240 possesses a sliding tri-glide 241 before second strap segment end 240b is looped through a first half of fastener 242a. The second strap end 240b of strap segment 240 is then looped around the center member of sliding tri-glide 241 and coupled to itself by stitching 243. The configuration of strap segment 240, tri-glide 241, & first half of fastener 242a allows for the length of strap segment 240 to adjust and fasten to second half of fastener 242b after encircling below the mandible as shown in FIG. 4.

With reference to FIG. 5 top plan view of retainer assembly, strap segment 250 is coupled to temple arm fastener 210 by stitching the first strap segment end 250a near temple arm fastener terminal opening 210a. The second end 250b of strap segment 250 is looped through the second half of fastener 242b and coupled to itself by stitching 251.

With reference to FIG. 4 strap segment 240 encircles the mandible and connects to strap segment 250 by fastener ends 242a and 242b. Strap segments 240 and 250 in conjunction with sliding tri-glide 241 apply a holding force of human anatomy eye-wear 100 firmly to the maxilla of the animal to resist movement from the animal's intense activities, effectively preventing eye-wear from being shaken off or disrupting position on the maxilla.

With reference to FIG. 5, this embodiment's force or length is adjustable through sliding tri-glide 241. More specifically, a user may draw the end of the sliding tri-glide 241 away from the first half of fastener 242a to cause a greater portion of strap segment 240 to overlap. Collectively, length of the strap decreases (e.g. length between temple arm fasteners 210 & 230) which accommodates a smaller sized animal muzzle and/or to fit closer to the mandible (e.g. applying more retainment force).

Similarly, a user may draw the sliding tri-glide 241 toward first half of fastener 242a to cause a smaller portion of strap segment 240 to overlap. Collectively, length of the strap increases (e.g. length between temple arm fasteners 210 & 230) which accommodates a larger sized animal muzzle and/or to loosen (e.g. applying less retainment force).

VII. OPERATION

In use, a user inserts the temple arms 110 & 130 of human anatomy eye-wear 100 into temple arm fasteners 210 and 230. With fastener ends 242a and 242b disconnected, the user then positions the animal eye-wear retainer over the head as to encircle the head with tether 220 behind the ears of the animal as shown in FIG. 4. The exact location will vary depending on animal crania anatomy.

The user then tightens tether 220 by sliding the buckle 221 toward the temple arm fasteners 210 & 230. Collectively decreasing the distance between the temple arm fasteners 210 & 230, allowing a larger portion of tether 220 to extend past slide buckle 221. Collectively, length of the tether 220 decreases (e.g. length between temple arm fasteners 210 & 230) which accommodates a smaller sized animal neck or head and/or to fit closer to the back of the head (e.g. apply more retainment force). This tightening holds human anatomy eye-wear 100 firmly toward the face of the animal while resting on the maxilla.

The user then encircles strap segment 240 below the mandible and connects fastener ends 242a and 242b. The user then tightens strap segment 240 by sliding the tri-glide 241 away from the first half of fastener 242a to cause a greater portion of strap segment 240 to overlap. Collectively, length of the strap decreases (e.g. length between temple arm fasteners 210 & 230) which accommodates a smaller sized animal muzzle and/or to fit closer to the mandible (e.g. applying more retainment force). This tightening holds human anatomy eye-wear 100 firmly down toward the maxilla of the animal.

To remove the human anatomy eye-wear 100 and retainer 200, a user would disconnect fastener ends 242a and 242b. The user would then loosen tether 220 by sliding the buckle 221 away from the ends of temple arm fasteners 210 and 230 to cause a smaller portion of tether 220 to extend past the adjustable slide buckle 221. Collectively length of the tether 220 increases (e.g. length between temple arm fasteners 210 & 230). The user can then remove the human anatomy eye-wear 100 and retainer assembly 200 from the animals head by removing the tether 220 from behind the animal's ears and lifting off its head.

To change human anatomy eye-wear 100 to a different function or fashionable human anatomy eye-wear, a user would remove human anatomy eye-wear temple arms 110 and 130 from temple arm fasteners 210 & 230. The user can then inserts the temple arms 110 & 130 of the desired human anatomy eye-wear 100 into temple arm fasteners 210 and 230.

VIII. CONCLUSIONS, RAMIFICATIONS, AND SCOPE

While the above description contains many specificities, these specificities should not be construed as limitations on the scope, but rather as an exemplification of one embodiment thereof. In various embodiments the straps may be rigid, semi-rigid, flexible, deformable, resilient, compressible, liquid impermeable, configured to float, configured to return to an original shape, fireproof, waterproof, heat resistant, flame resistant, magnetic, and/or have other properties suited to a particular application.

According to one embodiment of present disclosure of the animal eye-wear retainer is shown with various coupling methods of strap segment 240 and 250 to temple arm fastener 210 and 230. Coupling methods can vary by number of attachments along temple arm fastener 210 and 230, relative location of coupling along the temple arm fastener 210 and 230 in relation to the temple arm fastener terminal openings 210a and 230a, or coupling method configured to couple material per manufacturing techniques used by those skilled in the art.

With reference to FIG. 6A in other embodiments of the present disclosure, the tether 220 could be segmented into tether 220a and tether 220b and coupled to itself via a plurality of adjustable tether slide couplings 221a & 221b. This embodiment tether slide couplings 221a & 221b may allow the collective length of tether 220a & 220b to be adjusted. More specifically, a user may draw the ends of the tethers 220a & 220b away from each other to cause a greater portion of each tether to extend from the corresponding ends. Collectively, length of the tether decreases (e.g. length between temple arm fasteners 210 & 230) which accommodates a smaller sized animal neck or head and/or to fit closer to the back of the head (e.g. applying more retainment force).

Similarly, a user may draw the ends of the tethers 220a & 220b toward one another to decrease the amount of each tether extending from the corresponding ends. Collectively, length of the tether increases (e.g. length between temple arm fasteners 210 & 230) to accommodate a larger sized neck or head and/or loosen the tethers.

Reference throughout this specification to "an embodiment" or "the embodiment" means that a particular feature, structure, or characteristic described in connection with that embodiment is included in at least one embodiment. Thus the quoted phrases, or variations thereof, as recited throughout this specification are not necessarily all referring to the same embodiment.

Similarly, it should be appreciated that in the above descriptions of embodiments, various features are sometimes grouped together in a single embodiment, figure, or description thereof for the purpose of streamlining the disclosure. This method of disclosure, however, is not to be interpreted as reflecting an intention that any claims requires more features than those expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment. This disclosure includes all permutation of the independent claims with their dependent claims.

Recitation in the claims of the term "first" with respect to a feature or element does not necessarily imply the existence of a second or additional such feature or element. Elements recited in means-plus-function format are intended to be constructed in accordance with 35 U.S.C. § 112 ¶6. It will be apparent to those having skill in the art that changes may be made to the details of the above-described embodiments without departing from the underlying principles of the invention. Embodiments of the invention in which an exclusive property or privilege is claimed are defined as follows.

What is claimed is:

1. An animal eye-wear retainer, the eyewear includes a first temple arm and a second temple arm, the animal has a neck connecting a head to a torso, the head includes a back, a front and a mandible, comprising:
    a tether comprising a first tether end, a second tether end and a continuous tether length;
    a first temple arm fastener connected to the first tether end, for connecting the first tether end to the first temple arm of the eye-wear;
    a second temple arm fastener connected to the second tether end, for connecting the second tether end to the second temple arm of the eye-wear;
    a mandible strap of a first strap end, a first strap length, a second strap end and a second strap length, the first strap end connected to the first temple arm fastener and the second strap end connected to the second temple arm fastener;
    an adjustable slide buckle connected to the continuous tether length for tensioning the continuous tether length against the back of the head of the animal;
    a first fastener part connected to the first strap end; and
    a second fastener part connected to the second strap end, the first fastener part and the second fastener part for mating to secure the mandible strap below the mandible of the animal.

2. The animal eye-wear retainer of claim 1, wherein the continuous tether length is adjustable in relation to the eyewear by the adjustable slide buckle via pulling the adjustable slide buckle while retaining a portion of the continuous tether length passing through the adjustable slide buckle.

3. The animal eye-wear retainer of claim 1, wherein the first strap length may be shortened and lengthened by moving the first fastener part along the first strap length.

4. The animal eye-wear retainer of claim 1,
    wherein the first temple arm fastener forms a first generally cylindrical segment with first terminal opening to receive the first temple arm of the eye-wear and selectively retain the first temple arm fastener to the first temple arm by a first compression force of the first generally cylindrical segment; and
    wherein the second temple arm fastener forms a second generally cylindrical segment with a second terminal opening to receive the second temple arm of the eye-wear and selectively retain the second temple arm fastener to the second temple arm by a second compression force of the second generally cylindrical segment.

5. The animal eye-wear retainer of claim 4, wherein the first compression force and the second compression force retain the first temple arm and the second temple arm, respectively, by respective friction of the first generally cylindrical segment and the second generally cylindrical segment, respectively, whereby the first temple arm fastener and the second temple arm fastener are adaptable to a variety of sizes and shapes of the first temple arm and the second temple arm.

6. The animal eye-wear retainer of claim 1, wherein the first temple arm fastener has a first bore cross section and the second temple arm fastener has a second bore cross section.

7. An animal eye-wear retainer, an eye-wear includes a nose notch, lenses, and first temple arm and second temple arm, comprising:

a pull tight tether with a first end and a second end, to provide retention force to an animal's head around a back of the animal's head;

a first temple arm fastener connected to the first end, a second temple arm fastener connected to the second end, wherein the tether is a continuous length from the first end to the second end;

a slip buckle connected generally central to the continuous length of the tether, the slip buckle for tensioning the tether around the back of the animal's head when the eye-wear is positioned on an animal's extending nose via the nose notch;

a strap connected to the first temple arm fastener and the second temple arm fastener, the strap positioned under the animal's jaw when the eye-wear is positioned on the animal's nose;

a first strap segment of the strap terminating in a first end;

a second strap segment of the strap terminating in a second end;

a first fastener piece connected to the first end; and a second fastener piece connected to the second end;

wherein the first fastener piece and the second fastener piece mate to connect the strap under a jaw of the animal when the eye-wear is positioned on the animal's nose.

\* \* \* \* \*